April 3, 1973 C. HOFELT, JR 3,725,163
METHOD OF IMPROVING PERFORMANCE CHARACTERISTICS
OF PNEUMATIC TIRES
Filed July 21, 1970 2 Sheets-Sheet 2
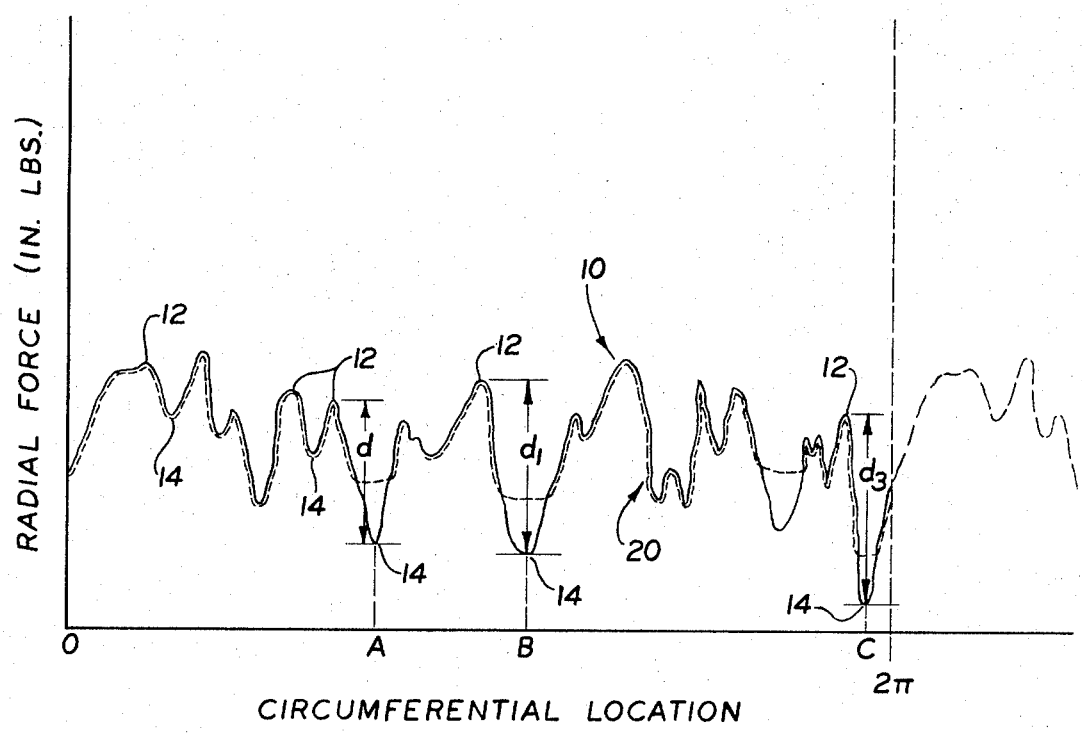
INVENTOR.
CLARENCE HOFELT, JR.
BY
*Harry F. Pepper, Jr.*
ATTORNEY

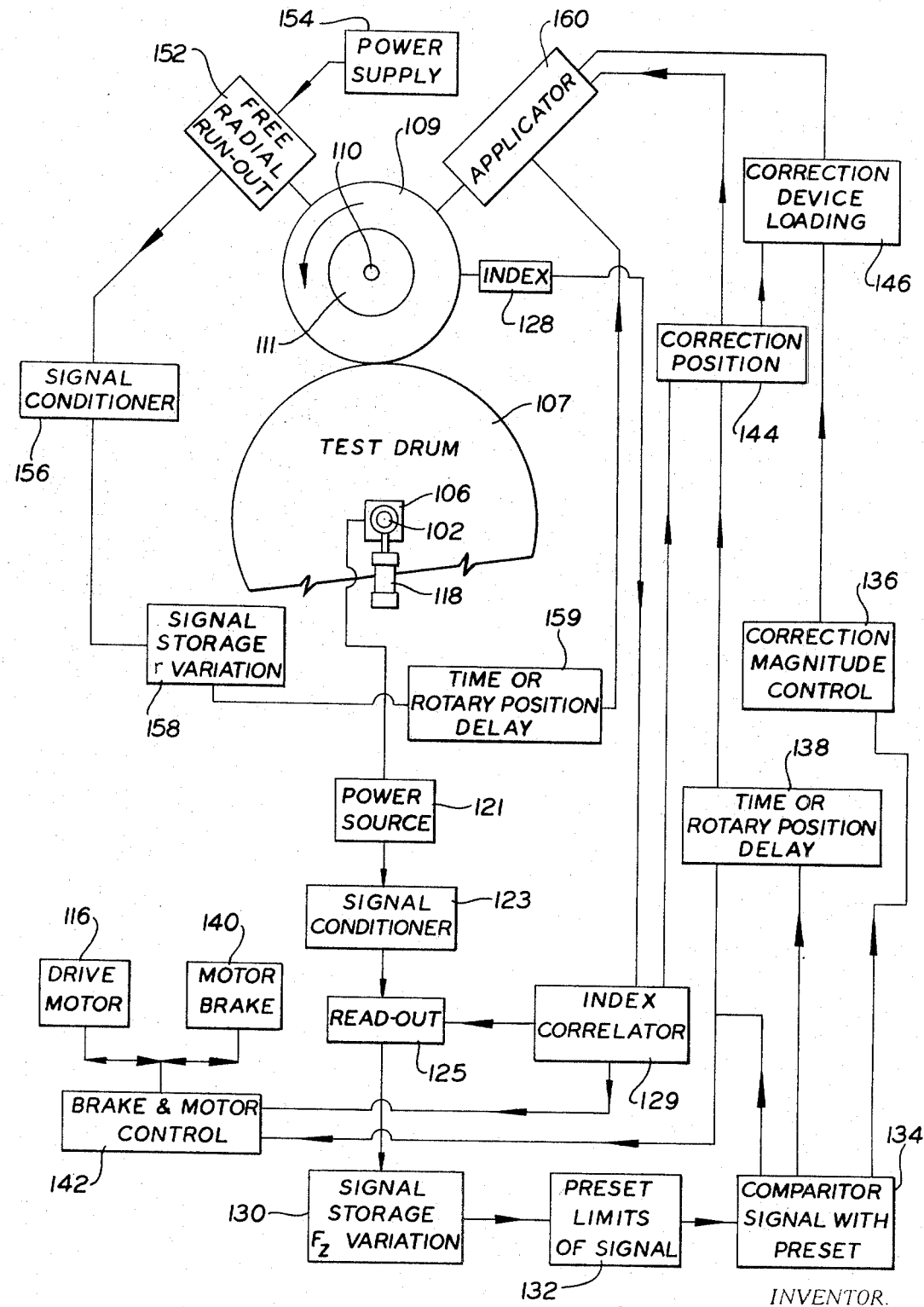

3,725,163
METHOD OF IMPROVING PERFORMANCE CHARACTERISTICS OF PNEUMATIC TIRES
Clarence Hofelt, Jr., Cuyahoga Falls, Ohio, assignor to The General Tire & Rubber Company
Continuation-in-part of application Ser. No. 613,252, Feb. 1, 1967. This application July 21, 1970, Ser. No. 57,384
Int. Cl. F16f 15/00
U.S. Cl. 156—64     16 Claims

ABSTRACT OF THE DISCLOSURE

Structural nonuniformity in pneumatic tires gives rise to self-excited force variations when the tire is rotated along a surface, such as a roadway. These force variations, when at an unacceptable level, can adversely affect the ride of a vehicle supported by pneumatic tires causing, for example, vehicle shake, noise, roughness, and slight steering disturbances. These variations are reduced to an acceptable level by subjecting the tire to a corrective action comprising applying a small amount of an adhering substance to the tread of the tire at a certain location or locations.

BACKGROUND OF THE INVENTION

This application is a continuation-in-part of copending U.S. patent application Ser. No. 613,252, filed Feb. 1, 1967 now abandoned in favor of continuation application U.S. Ser. No. 73,602, filed Sept. 18, 1970.

The invention relates to pneumatic tires and particularly to a method of improving certain performance characteristics of such tires.

The owners and manufacturers of vehicles, particularly automobiles, are becoming increasingly conscious of factors affecting vehicle ride. "Ride" is a broad, non-technical and somewhat aesthetic term used in describing a particular driver's reaction to several performance characteristics of a vehicle. Some of the characteristics tending to distinguish a bad-riding vehicle from a good-riding vehicle are continual or periodic vehicle shake, roughness, exterior, as well as interior noise, and slight steering disturbances.

Tire manufacturers also have become conscious of vehicle ride because some of these ride characteristics have found partially dependent upon the structural uniformity, or more accurately, nonuniformity of the tires used on the vehicle. Structural nonuniformity of a pneumatic tire causes the tire to produce or generate variable forces while rotating along a surface, as each portion thereof comes in contact with the surface. It has been found that when the variation of generated forces exceeds a specified level, adverse effects on vehicle ride can result. At certain speeds, for example, a rotating tire with constantly varying forces beyond such a level can produce a noticeable and almost rhythmic shake in the vehicle.

Because of the phenomenon just described, automobile manufacturers are now demanding that new automobiles or "original equipment" tire specifications include data showing that the tires meet prescribed limits or acceptable levels in respect of these force variations. Also, purchasers or replacement tires are now asking that these tires also comply substantially with the demands made by the automobile manufacturers.

In the aforementioned U.S. patent application Ser. No. 613,252 a detailed discussion is presented concerning many of the basic reasons for tire nonuniformity and their immediate or direct effects on the finished tire. This discussion acknowledges many attempts being made to produce a more uniform tire. What might be concluded from such a discussion is that it is extremely difficult, if not impossible, to build a pneumatic tire which is perfectly uniform. This is primarily due to the many irregularities associate with the construction, building and molding of a pneumatic tire. Thus, while much has been done to detect, control or otherwise obviate such irregularities, a perfectly uniform tire, from a purely constructional standpoint, is a product yet to be practically realized.

Along with efforts directed to improving the construction, building and molding of tires, there have been attempts made to correct, adjust or otherwise compensate for tire nonuniformity at the finished tire level. Many different methods have been used in an effort to correct specific tire irregularities once they are produced. For example, simple as well as sophisticated techniques exist for balancing tires. There have also been methods and apparatus for "truing" a tire by skimming the tread portion in order to make it perfectly round or concentric. This latter practice is used primarily to overcome a problem typically called "radial run-out," a term used to refer to the eccentricity of a tire. While some of these efforts have resulted in improving some of the noticeable effects of tire nonuniformity on ride, none of these efforts have accomplished the purpose of producing a finished tire capable of giving a smooth ride at all speeds without regard to the nature or type of vehicle upon which it is installed. In other words, none of these efforts have been found to overcome the adverse effects of nonuniformity generated force variations to the complete satisfaction of tire consumers.

Because of the immediate need for a solution to such problems, tire manufacturers have resorted to a more subjective analysis of tires, due primarily to the development of machines capable of analyzing and measuring with commendable accuracy the amount or level of force variations generated by a tire when rotating under load against a surface.

The machines used to measure these variations, usually referred to as "uniformity machines," typically include a means for mounting a tire on a rotatable axle, a drum attached to rotate freely, the axis of said drum being attached to appropriate strain gauges and means for measuring the forces exerted upon these strain gauges by the rotating tires. Signals produced by the forces can be relayed to an appropriate read-out device such as an oscilloscope, oscillogram, dial or meter. The strain gauges can be used, depending upon the way they are oriented with the axle of the drum, to measure either the radial forces (forces acting on the tire parallel to the wheel plane direction), lateral forces (those acting in the axial direction perpendicular to the wheel plane), or traction forces (those forces parallel to the wheel plane in the direction of motion of the tire). Furthermore, such strain, or other alternative force measuring devices, may be used to measure the various moments and invariant forces produced when the tire is rotated against the drum. Other transducers may be used to measure dimensional variations of the tire or to measure the torque required to rotate the tire.

With the aid of the uniformity machine, it has been realized that several types of force variations occur simultaneously during the rotation of an inflated tire under load against the surface. The forces include radial force variations, lateral force variations, and tangential force variations. It has been demonstrated from studies using uniformity machines that none of the preceding variations, with the possible exception of tangential force variations, are dependent upon the speed of rotation, assuming that resonance is not present. However, as indicated previously, one or more of these forces or force variations may become a predominant factor affecting ride at a given rotational speed, due to the establishment of resonance in the tire or in the tire-vehicle composite.

More recently, studies were made to attempt to relate either or both force and dimensional variations, or to establish characteristics oscillogram or read-out patterns or values to know tire construction deviations built into the tires. During the course of this work, it was observed that some tires would have small radial force variations along with large dimensional irregularities (e.g. radial run out) while other tires would have large radial force variations with small dimensional irregularities. These findings tended to explain the reluctance to simply "true" a tire in order to compensate for its nonuniformity, as suggested previously.

Still other studies, along with those mentioned above, have substantiated that the primary or principal force variation giving rise to those problems attributed to tire nonuniformity is the radial force variation. These studies led to the following approximation or approximate formula:

$$F_{z2}-F_{z1}=k(r_2-r_1)-\tfrac{1}{2}k(w_2-w_1)-\tfrac{1}{4}k[(r-w)_2-(r-w)_1]$$

where $F_z$ = radial force in pounds
$r$ = free radial run-out in inches
$w$ = free width in inches
$k$ = tire spring constant in pounds per inch
Subscripts 1 and 2 = two successive stations along the circumference of the tire Using this approximation as a basis, a method and apparatus was developed whereby a tire could be "corrected" or "altered" in respect of self-excited force variations by removing small amounts of rubber from specified locations along the peripheral tread area. This development ultimately formed the basis for the subject matter of the aforementioned United States patent application Ser. No. 613,252.

From the approximate formula stated above, it is seen that, as a practical matter, a tire when rotating under load against a surface generates a constantly changing radial force (value $F_z$) as each successive portion of the tire circumference engages the surface. Thus, a "radial force variation curve" can be produced for each tire revolution. The radial force variation curve is periodic, i.e. it repeats every revolution, so that the curve can be analyzed as a composite of a large number of harmonic curves. Thus, separating out a first, second or third order, as well as any other higher order, harmonic curves from the variation curve is possible by mathematical and electrical techniques.

The variation curve described appears as successive combinations of "peaks" and "valleys." When the difference between a peak value and a successive valley is such that it exceeds a prescribed value or level for a particular tire, it is an indication that the tire can adversely affect vehicle ride.

The concept advanced in the aforementioned United States patent application Ser. No. 613,252 is that when $F_{z2}-F_{z1}$ exceeds the acceptable variation level, grinding away or otherwise reducing the $r_2$ will reduce $F_{z2}-F_{z1}$ to a value equal to or less than the acceptable level. In other words, removing a slight amount of tread rubber at the location of a "peak" $F_z$ reduces the difference between the "peak" $F_z$ and its successive valley $F_z$.

Hereinafter, when referring to the methods and apparatus disclosed in United States patent application Ser. No. 613,252, for sake of brevity, and to avoid frequent repetition to the parent application by serial number, the term "corrective grinding" will be used.

While the corrective grinding approach has been highly successful, there are still some who are suspect of a procedure whereby rubber is removed from the tire. Also, corrective grinding, as a practical matter, can only be used on "correctable" tires. In other words, if the force variation or variations of a particular tire, which exceed the acceptable level are such as to also exceed a level where the grinding required may in fact harm the tire, then corrective grinding is not performed. Such tires are usually sold as "second line" tires. Still further, some of the grinding machinery and controls used in corrective grinding systems can be quite sophisticated and expensive for adaptation into a production line.

SUMMARY OF THE INVENTION

It is an object of the present invention to provide a method for reducing the degree of force variations in a pneumatic tire to an acceptable level.

It is another object of the present invention to provide a method for substantially compensating for force variations generated by a pneumatic tire, particularly radial force variations, so as to produce a smoother riding tire, even at high speeds.

It is yet another object of the present invention to reduce the amount of force variations in a pneumatic tire to an acceptable level without particular concern with regard to the level or degree of force variations being reduced.

It is still a further object of the present invention to provide a method for reducing force variations in a pneumatic tire to an acceptable level without removing rubber from the tire as by grinding and/or cutting.

The present invention achieves the above objects, as well as others evident from the description which follows, by adding material to, rather than taking material from, the tread portion of a tire. The material is applied at the circumferential location of a "valley" radial force, thereby achieving the desirable reduction of an unacceptable force variation to an acceptable level. The method utilized resembles in many ways the corrective grinding method, except for the final step or steps utilized to complete the method. Once the tire is analyzed with regard to force variations, and the location of those which need correction are determined, a slight amount of adhering material is added to the tread portion of the tire at the location of the low radial force component of each two component force variations to be corrected.

BRIEF DESCRIPTION OF THE DRAWINGS

FIG. 1 is a schematic block diagram showing generally a practical system whereby a method according to the present invention may be practiced.

FIG. 2 is a chart simulating force variation curves for a typical passenger tire before and after correction by the method according to the present invention.

DESCRIPTION OF PREFERRED EMBODIMENTS

It is evident from the foregoing discussion that the instant invention is an alternative process or method for improving the performance characteristics of tires in keeping with the disclosure of the aforementioned United States patent application Ser. No. 613,252, of which this application is a continuation-in-part. Many of the details, particularly of the apparatus and the electrical controls disclosed in the aforementioned United States patent application apply equally in the performance of the method to be herein described.

FIG. 1 is a schematic diagram of what might be called a typical tire uniformity machine modified according to the teachings of the present invention by the addition of an applicator. The typical uniformity machine comprises a test drum 107 having a smooth circumferential surface and a diameter of between about 10 to about 67 inches mounted upon a nonrotating axle 102 attached to suitable sensors 106. The tire 109, typically a passenger tire, is mounted on a rim such as a solid or split rim 111 or an ordinary car wheel which is in turn engaged with an axle 110 driven by an appropriate motor 116. Means such as a pair of hydraulic cylinders 118 connect to the drum axle 102, axially outside of the sensors 106, are used to move the test drum 107 into contact with the tire and to apply a given load thereto.

The output from the sensors 106, which may be strain gauges with electrical flexures, is fed into a suitable power source 121 and then into a signal conditioner 123 after which it is fed to a suitable read-out device 125, such as an oscilloscope or oscillograph, a magnetic tape, a paper tape, a peak-to-peak indicator, or an appropriate computer entry format. A signal is preferably biased in a suitable manner in the conditioner to eliminate the effect of the radial static load applied to the tire and can then be conditioned so that the low point of the signal is established on an arbitrary zero line and the amplitude of the signal is increased to render the signal easily readable. An appropriate indexing device 128 such as a simple chalk line, a tape line, or a magnetic strip may be used to mark a reference point on the tire. This provides means for the index correlator 129 to explicitly or implicitly mark the read-out device to provide means for correlating a point on the chart with the corresponding location on the tire.

Typically, the machine is used with two sensored units, one connected to either side of the test drum. Each sensored unit includes elements to measure both the radial and lateral forces. Inasmuch, however, as radial force variations are accepted to be primarily responsible for the physical factors of shake and roughness, the following explanation of the operation of the means for correction will be explained with reference to $F_z$, the radial forces. The read-out device 125 may serve as a signal storage or, alternatively, may feed the signal to a separate unit 130, such as a tape recorder, a magnetic disc, or a long persistence oscilloscope screen, an oscillogram, or an analogoue to digital converter, the output of which can be fed into a memory device such as a tape recorder with the recording and playback heads spaced apart from one another, a computer memory circuit, a punch tape format, or a mechanical delay device. In any event, the signal is retained for a sufficient length of time representing the movement of a specific location on the tire from the measurement location to the tire correction location. Angularly, this distance is usually assumed to be greater than 90° due to tread deformation which occurs as a given portion of the tire enters and leaves the drum contact area. Typically, the correction will occur between 90° and 270° after the footprint. This means that the signal must be stored or rather should be stored for at least one-fourth of a tire revolution before actuating the substance applying these.

Depending upon the control standards and the desirability or undesirability of correcting all tires regardless of the magnitude of the tire nonuniformity, it might be necessary that a limit device 132 be used to compare the magnitude of the force variations with a given arbitrarily selected upper and lower limit. However, in the instant case, because material is added to the tire rather than removing rubber from the tire, as in corrective grinding, this upper limit may not be necessary. Thus, if a maximum variation is less than a given lower or acceptable limit of variation, no correction would be made. On the other hand, variations above a maximum limit could cause the tire to be automatically rejected. However, in this case of adding material to the tire tread this may not be necessary for reasons described hereinbefore. Comparator means 134, such as an appropriate computer or computer circuitry, a photocell, magnetic tape or drum, or mechanical devices with appropriate sweep mechanisms might be used to compare the output from the signal storage unit 130 within the limit or limits of the preset signal device 132 to make this determination. The results of this comparison can be used on a commercial machine to actuate a set of relays which will automatically terminate the test, remove the load, deflate the tire and transfer it to a suitable conveying mechanism if the force variations are within an acceptable range. However, if correction is desired, the comparator will permit those force variation signals which are of sufficient magnitude to require correction to emit a command signal to the correctioh magnitude control device 136 to add the adhering substance to the tire. The control device 136 will regulate the loading device 146 which in turn could dictate the amount of substance to be added by the applicator 160. Delay mechanism 138 is used with the index correlator 129 to control a correction position device 144 which ensures that the applicator applies the substance at the proper location. Special sensing devices such as linear resistors, air orifices or the like are used to indicate when the applicator device is in proper position and to show the magnitude of the alteration. Suitable feedback is provided to ensure continuous control of these various operations. The delay mechanism 138 and index correlator 129 may be utilized to operate a control 142 for the motor 116 in driving the tire axle and, optionally, a brake 140 which may be used to temporarily halt the rotation of the tire at the proper location during the tire correction period. This brake 140 is used in instances when the substance to be applied is a substance which must be cured or will not dry rapidly enough to allow the rotating tire to continue rotating. In the case of application of tape or a suitable cement which is quickly dried, tire correction can take place while the tire is rotating in which case no brake would be necessary.

The free radial run-out of the tire at the point of alteration or application of the adhering substance is taken into account in determining the magnitude of the correction according to FIG. 1. This is accomplished through utilization of a displacement transducer 152 such as a linear potentiometer attached to a suitable power supply 154. The output from the transducer is fed to a signal conditioner 156 and then to a signal storage unit 158 in a time or position relay unit 159 whereupon it is fed to the applicator 160. In the tire applicator 160, the radial run-out signal and the correction signal may be handled separately through the use of individual hydraulic cylinders or may be combined mechanically, electrically or pneumatically so that only one cylinder is required for the applicator.

Transducer 152 may be positioned about 135° before the contact area between the tire 109 and the test drum 107 and the applicator 160 is located about 135° beyond this area. The transducer signal 152 is fed into the signal storage area and then into the delay unit 159 and is there held until the tire rotates about 170°, at which time it is transmitted to the applicator.

In the system just described, the several controls and measurements taken are primarily to determine and apply the proper amount of corrective substance at the proper amount of corrective substance at the proper location. The system can be simplified in the case of application for purposes of rendering the tire self-grinding. If a material is used which will not wear and can be used to "insulate" the low force locations while allowing the high force points to wear through use, a tire can become self-correcting. Some types of friction tape are suited to this purpose. In the case of a self-correcting tire, the amount of corrective substance is not as critical as described hereinbefore. Only the type of material and the location become significant.

The foregoing discussion may be further clarified by considering inferences made from the simulated radial force curve of FIG. 2. As seen in FIG. 2, the plot or chart demonstrates radial force values as a function of circumferential location. The circumferential location may, as shown in FIG. 2, be expressed in terms of radians with the length 0 to $2\pi$ representing one revolution of the tire. To the right of the $2\pi$ locus it is seen the curve begins to repeat itself.

The solid line 10 typifies a radial force variation curve before correction. The curve 10 may be described as a series of "peak" or high force points 12, each immediately followed by a "valley" or low force point 14. The 0 force line is an arbitrary reference and can be located wherever convenient. Assuming that the force differentials $d$, $d_2$ and $d_3$ between respective peaks 12 and valleys 14 indicated, are such as to exceed the accepted level for the type tire represented by a force curve such as 10, a control system, such as discussed in conjunction with FIG. 1, would direct the applicator 160 to correct or alter the tire at the proper circumferential locations A, B and C. After correction, the "valleys" of the curve at points A, B and C would rise and the force curve would appear as the broken line 20 in FIG. 2. Thus, none of the force variations simulated by the curve 20 would be greater than the accepted level.

In corrective grinding procedures as disclosed in parent application, United States Ser. No. 613,252, it is found best that correction be made at the two lateral margins or "shoulders" of the tread area. Similarly, in accordance with the instant invention, corrective material is best applied at the lateral margins or "shoulders" of the tread area.

It is understood that the system specifically indicated in FIG. 1 is exemplary of how the method according to the present invention may be automated.

The method according to the present invention, however, also contemplates the altering of force variations in a more simplified manner than specifically described in FIG. 1. For example, using the read-out from a typical force variation machine, a tire may be simply marked in the proper location as an indication where a small amount of adhering substance is to later be applied. The applicator 160, may be a controlled spray device, a tape applying means or a marker. Applicator 160 can be automatically provided with signals or readings from the uniformity measurements in order to apply the proper amount of the suitable substance to the proper location on the tire (i.e. at one or more of the "valley" or low force points or locations as described previously). In the alternative, tape, for example, might be applied only to cover the low force locations and thereby render the tire self-grinding as described hereinbefore.

From the foregoing, it is clear that several suitable materials can be used as the adhering substance to be applied to the tread. The material should be such as to be compatible with the tread rubber and capable of satisfactorily adhering thereto, particularly in the shoulder areas. The type of material applied can dictate the degree of automation possible in utilizing the process of the instant invention. For example, the substances used can be a suitable friction type tape, a quick drying or quick curing elastomeric cement, or some type of vulcanizable liquid elastomeric material. Of course, the substance used will greatly influence the type of device used as applicator 160.

These specific steps indicated by the foregoing as well as other obvious departures therefrom are considered to be within the concept of the present invention which is to be limited only by the scope of the following claims.

What is claimed is:

1. A method of improving the performance of a pneumatic tire as affected by variations in radial forces generated along the tread area of said tire while rotated under load against a surface, comprising the steps of
   (A) locating at least one portion of said tread area where variation in radial forces exceeds an acceptable magnitude and
   (B) applying an adhering substance to said portion of said tread area to reduce said variation to a magnitude equal to or less than said acceptable magnitude.

2. The method as defined in claim 1 wherein the adhering substance is applied to the lateral margins of said tread area.

3. The method as defined in claim 1 wherein said substance is friction-type tape.

4. The method as defined in claim 1 wherein said substance is a quick-drying rubbery cement.

5. The method as defined in claim 1 wherein said substnace is a vulcanizable elastomeric material.

6. The method as defined in claim 2 wherein said substance is friction-type tape.

7. The method as defined in claim 2 wherein said substance is a quick-drying rubbery cement.

8. The method as defined in claim 2 wherein said substance is a vulcanizable elastomeric material.

9. Method of improving the performance of a pneumatic tire affected by variations in radial forces generated along the tread area of said tire while rotated under load against a surface, comprising the steps of
   (A) measuring variations in radial forces generated along said tread area;
   (B) determining locations along said tread area where variations in radial forces exceed an acceptable magnitude; and,
   (C) applying a substance to said locations thereby
      (1) reducing the variations at said locations to a magnitude equal to or less than said acceptable magnitude.

10. The method as defined in claim 9 wherein the adhering substance is applied to the lateral margins of said tread area.

11. The method as defined in claim 9 wherein said substance is a strip of friction-type tape.

12. The method as defined in claim 9 wherein said substance is a quick-drying rubbery cement.

13. The method as defined in claim 9 wherein said substance is a vulcanizable elastomeric material.

14. The method as defined in claim 10 wherein said substance is friction-type tape.

15. The method as defined in claim 10 wherein said substance is a quick-drying rubbery cement.

16. The method as defined in claim 10 wherein said substance is a vulcanizable elastomeric material.

References Cited

UNITED STATES PATENTS

| 3,060,733 | 10/1962 | Herzegh | 73—146 |
| 2,245,355 | 6/1941 | Mullen | 73—480 |
| 2,640,727 | 6/1953 | Kennedy | 301—5 B |
| 2,193,734 | 3/1940 | MacCracken | 156—75 |
| 3,574,973 | 4/1971 | Rader | 51—169.9 |
| 3,527,103 | 9/1970 | Hale et al. | 73—462 |
| 2,080,227 | 5/1937 | Periat et al. | 156—75 |

BENJAMIN A. BORCHELT, Primary Examiner

H. TUDOR, Assistant Examiner

U.S. Cl. X.R.

51—106, 165; 301—5 B